(12) United States Patent
Gaertner et al.

(10) Patent No.: US 7,318,121 B2
(45) Date of Patent: Jan. 8, 2008

(54) SYNCHRONIZED MIRRORED DATA IN A DATA STORAGE DEVICE

(75) Inventors: Mark A. Gaertner, Vadnais Heights, MN (US); Luke W. Friendshuh, Elko, MN (US); Stephen R. Cornaby, Yukon, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 11/283,273

(22) Filed: Nov. 18, 2005

(65) Prior Publication Data

US 2006/0075202 A1 Apr. 6, 2006

Related U.S. Application Data

(62) Division of application No. 10/185,063, filed on Jun. 28, 2002, now Pat. No. 6,996,668.

(60) Provisional application No. 60/310,368, filed on Aug. 6, 2001.

(51) Int. Cl.
*G06F 13/14* (2006.01)
(52) U.S. Cl. .................................... 711/114
(58) Field of Classification Search ............... 711/112, 711/114
See application file for complete search history.

(56) References Cited

U.S. PATENT DOCUMENTS

| | | | |
|---|---|---|---|
| 5,091,680 A | 2/1992 | Palm | 318/368 |
| 5,363,355 A | 11/1994 | Takagi | 369/32 |
| 5,377,094 A | 12/1994 | Williams et al. | 714/5 |
| 5,448,719 A | 9/1995 | Schultz et al. | 714/5 |
| 5,508,874 A | 4/1996 | Williams et al. | 361/92 |
| 5,519,831 A | 5/1996 | Holzhammer | 714/22 |
| 5,572,660 A | 11/1996 | Jones | 714/6 |
| 5,584,007 A | 12/1996 | Ballard | 741/113 |
| 5,586,291 A | 12/1996 | Lasker et al. | 711/113 |
| 5,588,129 A | 12/1996 | Ballard | 711/113 |
| 5,761,705 A | 6/1998 | DeKoning et al. | 711/113 |
| 5,764,945 A | 6/1998 | Ballard | 711/113 |
| 5,787,460 A | 7/1998 | Yashiro et al. | 711/114 |
| 5,889,629 A | 3/1999 | Patton, III | 360/75 |
| 5,911,779 A | 6/1999 | Stallmo et al. | 714/6 |
| 6,061,194 A | 5/2000 | Bailey | 360/47 |
| 6,070,225 A | 5/2000 | Cheung et al. | 711/112 |
| 6,163,422 A | 12/2000 | Blumenau | 360/47 |
| 6,542,962 B2 * | 4/2003 | Kodama et al. | 711/114 |
| 6,571,324 B1 | 5/2003 | Elkington et al. | 711/162 |
| 6,854,071 B2 | 2/2005 | King et al. | 714/8 |
| 2002/0010762 A1 * | 1/2002 | Kodama | 709/219 |

OTHER PUBLICATIONS

Patterson DA, Gibson G, Katz RH, "A case for redundant arrays of inexpensive disks (RAID)," Sigmod Record, acm press (Chicago), vol. 17 (No. 3), p. 109-16, (Sep. 28, 1998).

* cited by examiner

*Primary Examiner*—Kevin L. Ellis
(74) *Attorney, Agent, or Firm*—Westerman, Champlin & Kelly

(57) ABSTRACT

A data storage device mirrors data on a data storage medium. The multiple instances of data are synchronized in order to optimize performance of the reading and writing, and the integrity of the data. Preferably, a data storage device is allowed to defer writing multiple copies of data until a more advantageous time.

8 Claims, 10 Drawing Sheets

SYNCHRONIZED MIRRORED DATA IN A DATA STORAGE DEVICE

RELATED APPLICATION

This present application is a divisional of and claims priority of U.S. patent application Ser. No. 10/185,063, filed Jun. 28, 2002, now U.S. Pat No. 6,996,668 which claims the benefit of U.S. Provisional Application Ser. No. 60/310,368 filed Aug. 6, 2001, both of which are hereby incorporated by reference in their entirety.

This application is related to U.S. Pat. No. 6,295,577 issued Sep. 25, 2001, entitled "Disc storage system having a non-volatile cache to store write data in the event of a power failure."

FIELD OF THE INVENTION

This invention relates generally to data storage devices, and more particularly to data mirroring in data storage devices.

BACKGROUND OF THE INVENTION

In order to increase fault tolerance in a group of data storage devices, data mirroring is often implemented. Previously, data mirroring has been implemented in redundant array of inexpensive discs (RAID). Data mirroring may be implemented in RAID devices by writing duplicate instances of data to each of two or more disc drives in the RAID device. Conventional RAID mirroring schemes use controlling technology outside the disc drive to manage the duplicated data, such as in a RAID controller. The RAID controller, either in the form of software or hardware, manages which instance of data to read. The data has to be written at least twice to synchronize the mirrored data every time there is a write request. This can cause a performance problem because the number of write requests has increased and correspondingly the time to complete them has increased.

On the other hand, data mirroring has also been performed in single disc drives. Data mirroring in a single drive poses the same problems as data mirroring in a RAID system, as well as additional problems. For instance, the average latency of an unqueued read request in a non-mirrored disc drive is one half revolution because the one instance of data that is read is one-half of a revolution away from the head when the read request is initiated. To improve the inherent latency problems in a disc drive, data mirroring has been incorporated into disc drives. By placing mirrored data on the same disc drive at different angular positions, the latency problems associated with a read request have been substantially lowered. This is accomplished because the multiple copies of data, usually placed 180 degrees opposed from each other, reduces the average latency of a read request to one-quarter of a revolution. However, the benefits of the performance gain for read requests is offset by the performance loss of the write requests.

The problem is that a write request must either write all copies immediately or deal with complications of having different data on the copies. If all copies are written immediately, then the average latency of an unqueued write request is three-quarters of a revolution; one-quarter for the first copy to be written and one-half for the second copy to be written.

What is needed is a system, method and/or apparatus that manages the reading and writing of mirrored data in a manner that minimizes the performance degradation during writes, yet provides the ability to read the most recently written data.

SUMMARY OF THE INVENTION

The above-mentioned shortcomings, disadvantages and problems are addressed by the present invention, which will be understood by reading and studying the following specification.

In the present invention, the above mentioned problems are solved by allowing a data storage device to defer writing the copies of the data until a more advantageous time. One embodiment of the present invention provides a method to select the most effective copy to write. Subsequently, the method may defer the writing of the other copies until a more advantageous time. Another embodiment includes a method that allows a drive to be self-aware as to whether the copies contain the same data. Subsequently, the method insures that the most recent copy is returned on a read request. In addition, the present invention also can be implemented as a data storage device or as a data storage system.

These and various other features as well as advantages which characterize the present invention will be apparent upon reading of the following detailed description and review of the associated drawings.

DETAILED DESCRIPTION OF THE INVENTION

The invention described in this application is useful for all types of data storage devices, including hard-disc drives, optical drives (such as CDROMs), ZIP drives, floppy-disc drives, and many other types of data storage devices.

Figure 1:
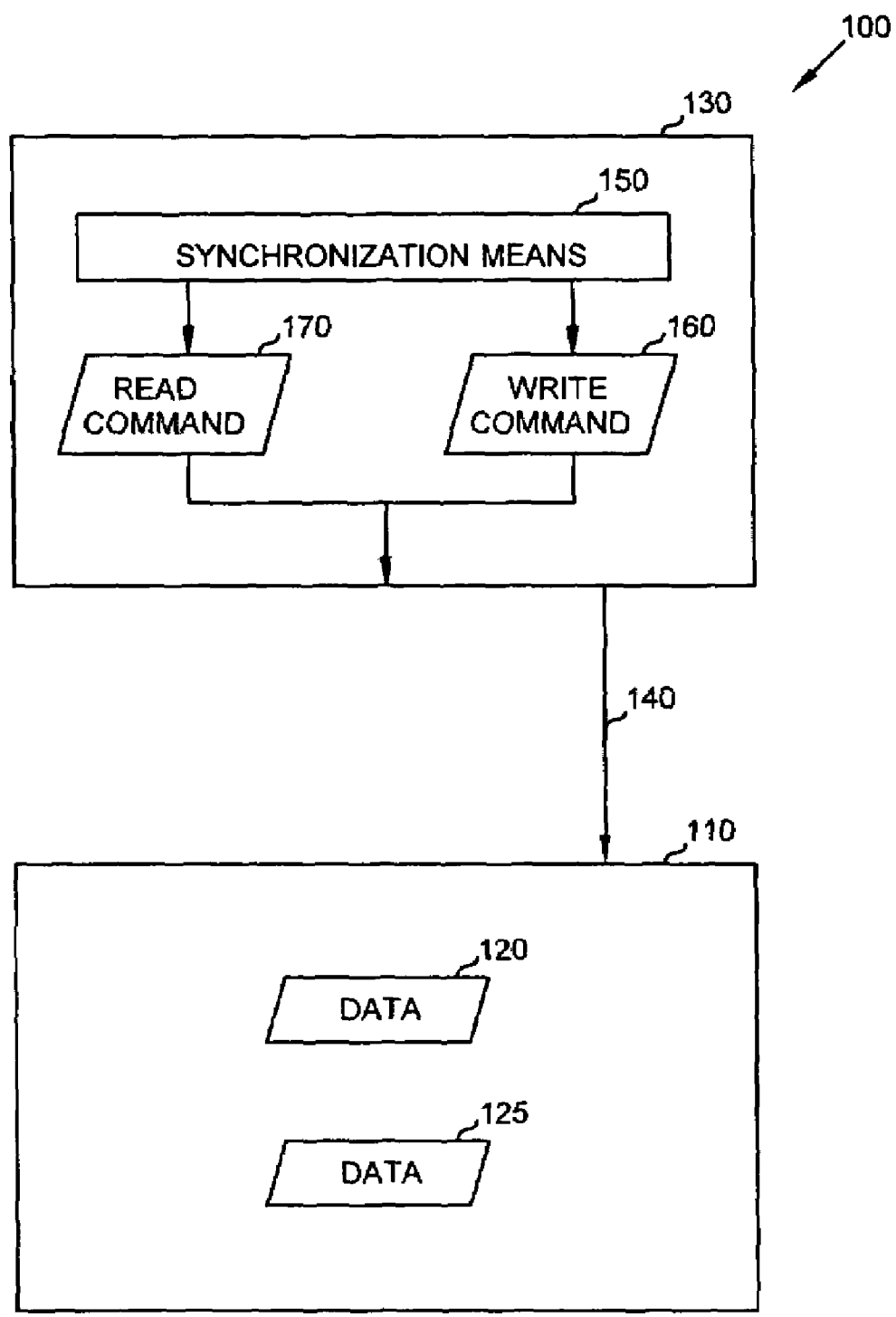
FIG. 1 is a block diagram that provides a system level overview of the operation of embodiments of the present invention.

Referring now to FIG. 1, a system level overview 100 of the operation of embodiments of the present invention is shown. Embodiments of the invention operate in a data storage device, such as a magnetic disc drive 1300 in FIG. 13.

System 100 manages mirrored data 120 and 125 stored on a data storage medium 110. System 100 also includes a processor 130 that is operably coupled to the data storage medium 110 through signal lines 140. System 100 also includes synchronization means 150 operative on the processor 130 to synchronize the mirrored data 120 and 125 on the data storage medium 110. In some embodiments, synchronizing accounts for, and/or is performed in reference to various caching techniques, such as caching in a non-volatile medium, caching in a volatile medium, or no caching. In varying examples of the synchronization means 150, mirrored data 120 and 125 is associated with a write command 160 or a read command 170. In some examples, the system 100 is incorporated in a data storage device, such as a disc drive, and the data storage medium 110 is a recording medium, such as a disc assembly. System 100 provides the advantage of synchronizing mirrored data within a data storage device.

In general, there are two manners to perform a write command of synchronized data; either all mirrored instances of the write data are written immediately to the data storage medium, or the instances are written at different times and must be managed on the data storage medium in a manner that maintains the ability to retrieve the most current instance. The instances are also known as "copies." A request to write an instance is referred to as a write sub-request.

Writing all instances immediately is a solution that is easy to implement, but is generally lacking in performance. In a rotational storage device, such as disc drive 1300, when all instances of data are written immediately, the average latency of an unqueued write sub-request is three quarters of a revolution; one quarter of a revolution for the first write and one half of a revolution for a second write, where the copies are written 180 degrees opposed to each other. Writing all instances of synchronized mirrored data is a relatively simple solution to implement in the firmware of the data storage device. However, this approach can cause temporary peaks in the activity of the disk drive. The temporary peaks in activity are caused by multiple write sub-requests of mirrored data to the data storage medium of the disk drive that are performed for each singular write command received by the disk drive.

Furthermore, a read request for synchronized mirrored data is performed generally faster than a read request for unsynchronized non-mirrored data, as discussed below in conjunction with method 200 in FIG. 2.

Managing synchronized mirrored data on a data storage medium in a manner that maintains the ability to retrieve a current instance yields better performance than conventional systems. In this manner, a first instance or instance of the mirrored data is written. After the first instance is written, all other instances of the mirrored write data are not written, instead the write sub-requests are deferred until a more advantageous or opportune time. Thus, the initial instance of synchronized mirrored data is written in the same amount of time as one instance of unsynchronized non-mirrored data in conventional solutions. Deferring the writing of the other instances until a time when the drive is idle yields a substantial performance improvement to a conventional data mirroring system and also yields no substantial performance degradation in comparison to writing non-mirrored data systems.

However, writing the first instance of synchronized mirrored data and the other instances of synchronized mirrored data at different times creates complexity that must be managed. Read requests to a location in which instances do not contain the same data must read the most recent data. Due to the deferring of the writing of an nth instance, the most recent data may only reside in one of the locations or in cache. Power loss, reset conditions, and any other event that destroys volatile memory contents could prevent the deferred instances from ever being written.

Figure 2:
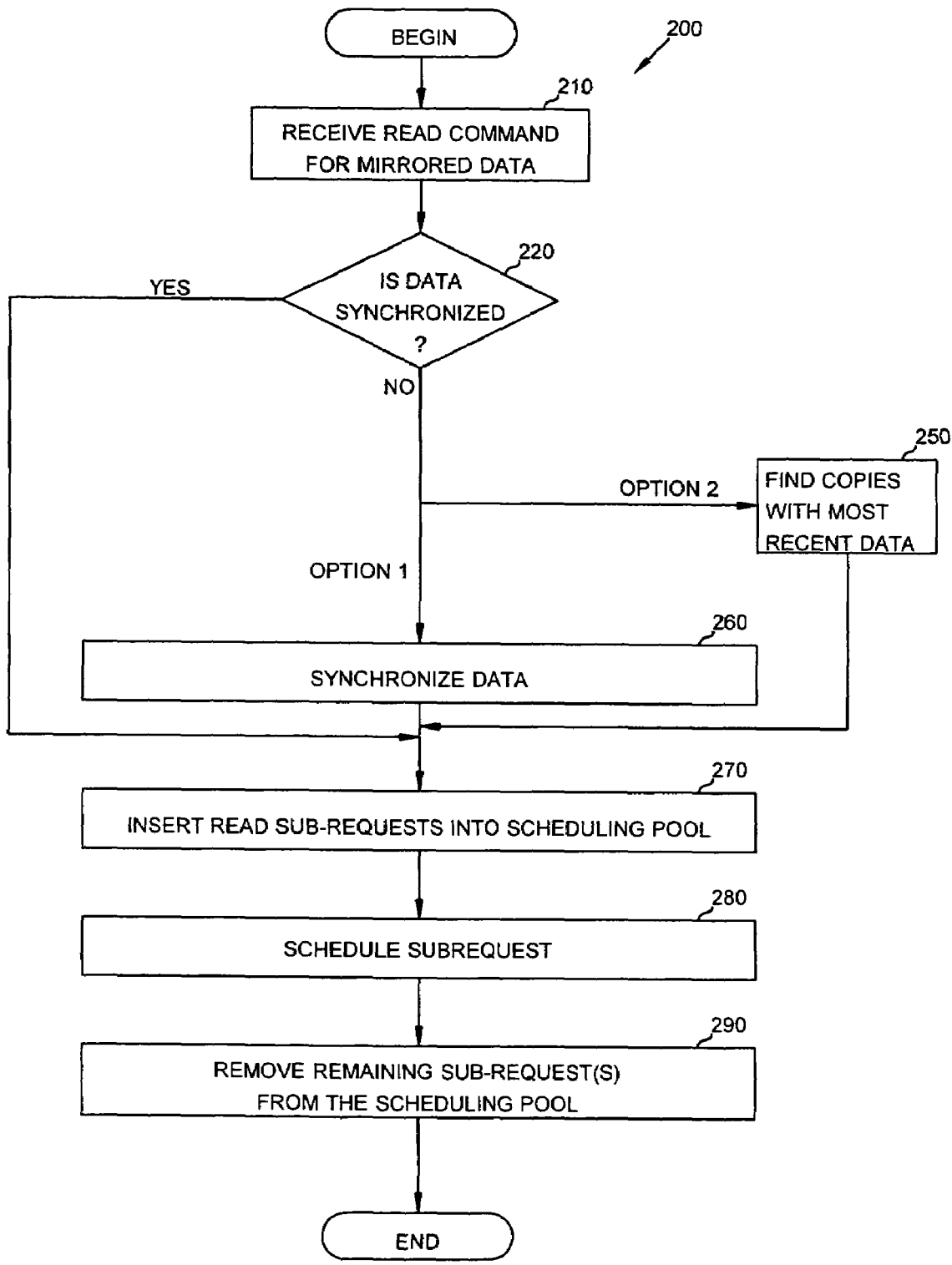
FIG. 2 is a flowchart of a method to manage retrieval of data according to an embodiment of the invention.

FIG. 2 is a flowchart of a method 200 to manage retrieval of data from a data storage device that has mirrored data according to an embodiment of the invention. In general, read performance is improved by selecting the most effective instance to read. Method 200 includes receiving 210 a read command associated with mirrored data that is stored on a data storage medium in the data storage device. Mirrored data usually includes at least one initial instance of data and at least one copy of the initial instance of data. Further, method 200 may include determining 220 whether the read command is associated with synchronized or unsynchronized data. Preferably, in some embodiments, the determination is made from data obtained from an outstanding-copy-write (OCW) list.

An OCW list is a data structure, such as a table or a queue, that indicates write sub-requests that have not been performed to a data storage medium. When a write sub-request is performed, it is removed from the OCW list. The OCW list is discussed in further detail below in relation to write commands. In some embodiments, the determination is based on an indicator, such as a bit flag.

When the determining 220 indicates that the data is synchronized, steps 270, 280, and 290 may be performed. When the determining 220 indicates that the data is unsynchronized, the method 200 has two options enabling it to retrieve the most recent data. The first option includes synchronizing 260 the data by completing the writes related to the OCW entries. Once this is done, the method may proceed to inserting 270 the read sub-requests into the scheduling pool. An alternative to option 1, the method 200 may perform option 2. Option 2 includes finding 250 the copies with the most recent data. This may require breaking the read request into pieces because the most recent data may not exist on one copy. The method 200 may be designed to include only one of the options or both of the options.

When the read command does not specify the most recently written data, the read data is synchronized 260. In one embodiment of the synchronizing 260, the synchronizing includes completing write command entries in an OCW list associated with the read command. The OCW list may include read and write commands for instances of mirrored data. Synchronizing 260 the data is the primary distinction between a synchronized read and an unsynchronized read.

Method 200 continues with inserting 270 one or more, or all, read sub-requests into a scheduling pool. In some embodiments, the read request received 210 is divided or partitioned into Y sub-requests where Y is the number of synchronized instances. Thereafter, method 200 includes scheduling 280 one of the read sub-requests. In some embodiments, the scheduling pool is implemented with a rotational position sorting (RPS) queue. Scheduling 280 may includes scheduling sub-requests in reference to pre-determined parameters. For example, in a disc drive 1300, the scheduling may be done in reference to a seek time and latency of the read sub-request. A scheduling algorithm as disclosed in U.S. Pat. No. 5,570,332 may be used to accomplish this.

Method 200 also includes removing 290 remaining sub-requests from the scheduling pool. The remaining sub-requests are the sub-requests that were not scheduled 280. Method 200 can enhance the performance of a data storage device because the method 200 allows the data storage device to determine the instance that can be read most quickly. In a preferred embodiment of the present invention, method 200 is completely internal to the data storage device, thus a data storage device is much more capable than a conventional external controller of optimizing mirrored read performance. For example, where the data storage device is a disc drive, the disc drive uses information that is not readily available externally to the data storage device, such as the geometry of the disc drive and current position of the read/write head to schedule the optimal command.

Figure 3:
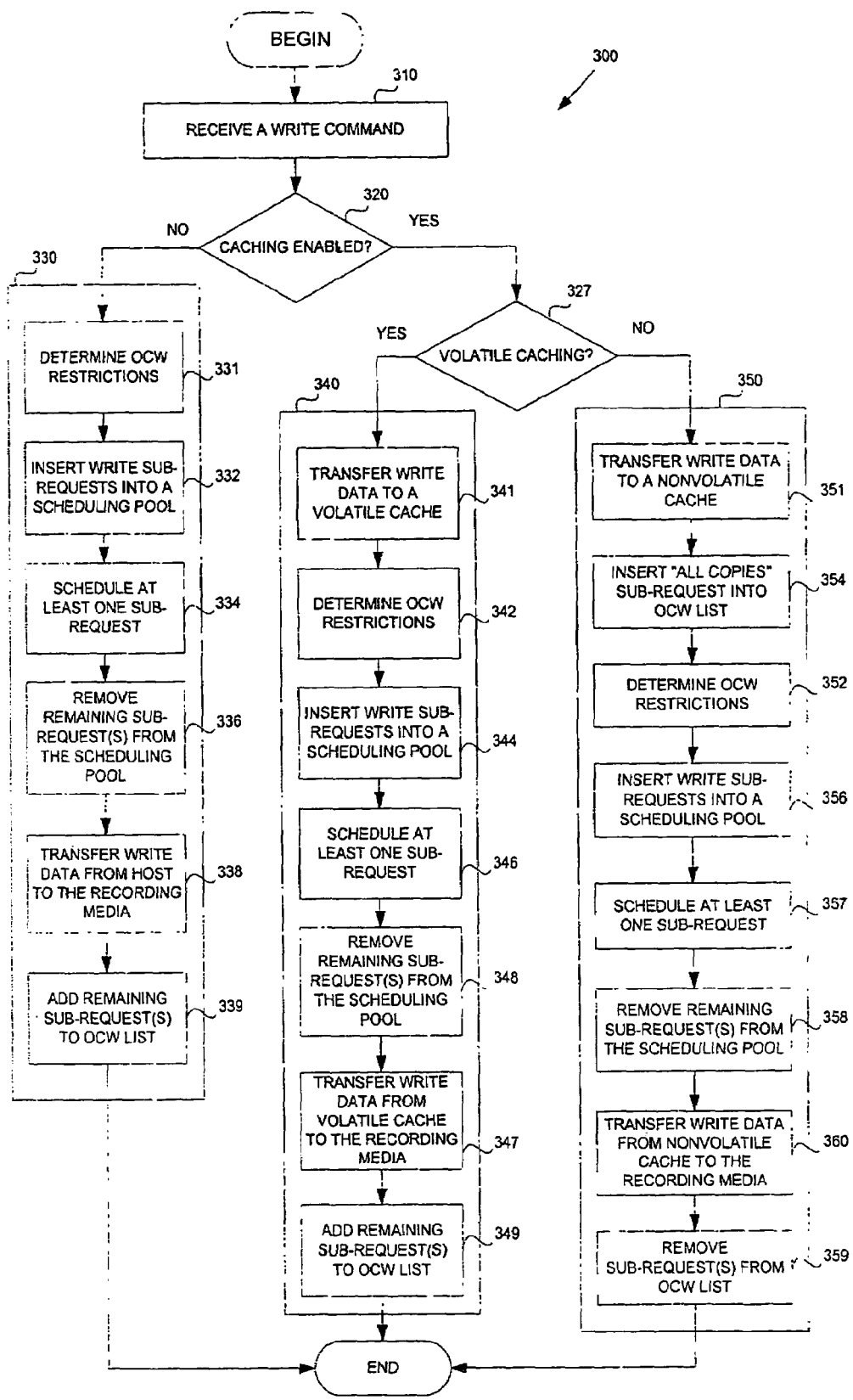
FIG. 3 is a flowchart of a method to manage writing of data according to an embodiment of the invention.

FIG. 3 is a flowchart of a method 300 to manage writing of data on a data storage device that has synchronized mirrored data, according to one embodiment of the invention.

A write command may either write all instances immediately to the data storage medium or manage instances on the data storage medium having various versions of the data. If all instances are written immediately, then the average latency of an unqueued write command is three quarters of a revolution. This is often not a desirable solution because this is slower than merely performing the first write sub-request.

One solution is to defer the writing of the copies of the data to a more advantageous time. If writing copies is performed at a time when the data storage medium is idle, there is no performance degradation from writing the copies. In contrast, writing copies when the data storage medium is not idle can degrade performance of the data storage device. The most recent data may only reside in some of the instance locations or cache. Thus, read sub-requests to a location must read the most recent data. Power loss, reset conditions, and any other event that destroys memory contents could possibly prevent the cached instances from ever being written.

Method 300 includes receiving 310 a write command that specifies whether the data requested is associated with mirrored data. Thereafter, method 300 includes determining 320 whether the write command is associated with enabled or disabled caching. In some embodiments, the determining 320 yields an indication that the write command specifies disabled caching. Subsequently, the writing 330 of one or more instances of the data may be performed. The writing 330 can include inserting 332 one or more write sub-requests into a scheduling pool, scheduling 334 one or more of the write sub-requests, removing 336 remaining sub-requests from the scheduling pool, transferring 338 data associated with the write command from host to the recording media, and adding 339 remaining write sub-requests to an OCW list. To enable the OCW list to be accurate in the event of a power loss or similar condition, once the transferring 338 has started, the adding 339 remaining write sub-requests must be completed. Thus, functions 338 and 339 must be done in an atomic, indivisible manner. In other words, if transferring 338 is started, adding 339 must be guaranteed to complete successfully.

When the write command specifies enabled caching, a caching type determination 327 as to whether or not the caching is in a volatile medium or in a non-volatile medium. When volatile caching is used, a method 340 is performed that synchronizes the instances of the data related to the write request.

Synchronization of data is performed by transferring 341 data associated with the write command to a volatile cache and transmitting an indication of completed status to a host (not shown). Next, determining 342 restrictions in reference to an OCW list is completed. Thereafter, all write sub-requests are inserted 344 into a scheduling pool. Write commands are divided or partitioned into N sub-requests for a data storage device having N instances. Each sub-request may have its own rotational positional if the N instances are rotationally staggered.

Next, scheduling 346 is done for at least one of the write sub-requests. A write sub-request may be selected 346 from among the plurality of write sub-requests in accordance with a rotational position-sorting (RPS) algorithm. The RPS algorithm selects the sub-request that is associated with the instance of data that will yield predetermined throughput and/or response time characteristics. At least two write sub-requests are scheduled when the determination of OCW restrictions indicates that adding entries for the sub-requests will cause OCW list entries to logically overlap with one another.

Method 340 also includes removing 348 remaining sub-requests from the scheduling pool. Preferably, the remaining sub-requests that are removed 348 were not scheduled 346. After the remaining sub-requests are removed 348, transferring 347 data associated with the write command from host to the recording media is completed. Finally, adding 349 the remaining write sub-requests to the OCW list is performed. In some embodiments, write sub-requests that were not added to the OCW list, because of restrictions in the OCW list that no longer exist, are added to the OCW list. In some embodiments, some of the write sub-requests are not added to the OCW list in order to ensure integrity of the OCW list. In some embodiments, the write sub-requests may be performed rather than stored in the OCW for later performance. In some embodiments, the remaining write sub-requests' data may also be saved in the cache in addition to being added to an OCW list. To enable the OCW list to be accurate in the event of a power loss or similar condition, once the transferring 347 has started, the adding 349 remaining write sub-requests must be completed. Thus, functions 347 and 349 must be done in an atomic, indivisible manner. In other words, if transferring 347 is started, adding 349 must be guaranteed to complete successfully.

In some embodiments, when the determining 327 yields an indication that the write command is associated with nonvolatile caching, method 350 is accomplished. Preferably, method 350 includes transferring 351 data associated with the write command to a nonvolatile cache. Next, method 350 includes inserting 354 an entry into the OCW list that does not specify an instance; rather, a pointer to data in a cache is included. This type of OCW list entry designates that all copies of the data need to be written. To enable the OCW list to be accurate in the event of a power loss or similar condition, once the transferring 351 has started, the inserting 354 the all copies designated write sub-request must be completed. Thus, functions 351 and 354 must be done in an atomic, indivisible manner. In other words, if transferring 351 is started, inserting 354 must be guaranteed to complete successfully.

Next, determining 352 restrictions in reference to an OCW list may be completed. In some embodiments, some of the write sub-requests are not added to the OCW list in order to ensure integrity of the OCW list. Also in some embodiments, the write sub-requests may be performed rather than stored in the OCW for later performance. Specifically, if adding to the OCW list is not possible without creating overlapping LBA ranges for different instances, the corresponding copies can be synchronized by flushing write sub-requests from the OCW list prior to writing any new data. Thereafter, method 350 includes inserting 356 all possible write sub-requests into a scheduling pool. Some write sub-requests may not be added to the OCW list to ensure OCW list integrity; therefore, these write sub-requests must be written to the storage medium.

Subsequently, method 350 includes scheduling 357 at least one of the write sub-requests. The write sub-request may be selected from among the plurality of write sub-requests in accordance with a rotational position-sorting (RPS) algorithm. The RPS algorithm may select the sub-request that is associated with the instance of data that will yield predetermined throughput and/or response time characteristics. At least two write sub-requests are scheduled when the determination of OCW restrictions indicates that adding entries for the sub-requests will cause OCW list entries to logically overlap with one another.

Method 350 also includes removing 358 remaining sub-requests from the scheduling pool. The remaining write sub-requests are writes that were not scheduled. The remaining sub-requests may include all of the corresponding sub-requests that would have been indicated due to the all copies designation, minus the write sub-request corresponding to the copy that was written. After the remaining sub-requests are removed 358, transferring 360 data associated with the write command from host to the recording media is completed.

To enable the OCW list to be accurate in the event of a power loss or similar condition, once the transferring 360 has started, the adding 359 remaining write sub-requests must be completed. Thus, functions 360 and 359 must be done in an atomic, indivisible manner. In other words, if transferring 360 is started, adding 359 must be guaranteed to complete successfully.

Finally, method 350 includes removing 359 write sub-requests for the write command from the OCW list after the write sub-requests are performed. The removing 359 may include removing the OCW list entry with the data pointer that designates all copies need to be written; then adding all write sub-requests corresponding to unwritten copies to the OCW list. Remaining OCW entries for the original all copies designated entry no longer need to maintain a cache data pointer.

All write commands of synchronized data involve the use of an OCW list that represents write sub-requests to the data storage medium that have not been performed. The OCW list includes one or more entries. In one embodiment, each entry includes a representation of a logical block address and a representation of which instance of the write request is the sub-request. For example, an entry may represent the first write sub-request of two write sub-requests that were generated from a write request. Each entry may also include a representation of the length of the write-data associated with the sub-request, such as the number of bytes of data of the write sub-request. Further, each entry may also include a representation of a location of the write-data, such as cache, or nonvolatile cache.

In method 300, ranges of logical block addresses (LBAs) of the OCW list entries are not allowed to logically overlap with one another. When adding to the OCW list, entries can be merged to avoid logically overlapping entries. If all write sub-requests can be added to the OCW list without creating overlapping entries then there may be no restrictions. If only some of the write sub-requests can be added, then only non-overlapping write sub-requests are inserted into the OCW list. Allowing only non-overlapping write sub-requests requires restricting the scheduling of overlapping instance write(s). If none of the write sub-requests can be added to the OCW list while maintaining no overlapping entries, then write sub-requests must be flushed from the OCW list to allow entries to be added to the OWC list.

Figure 4:
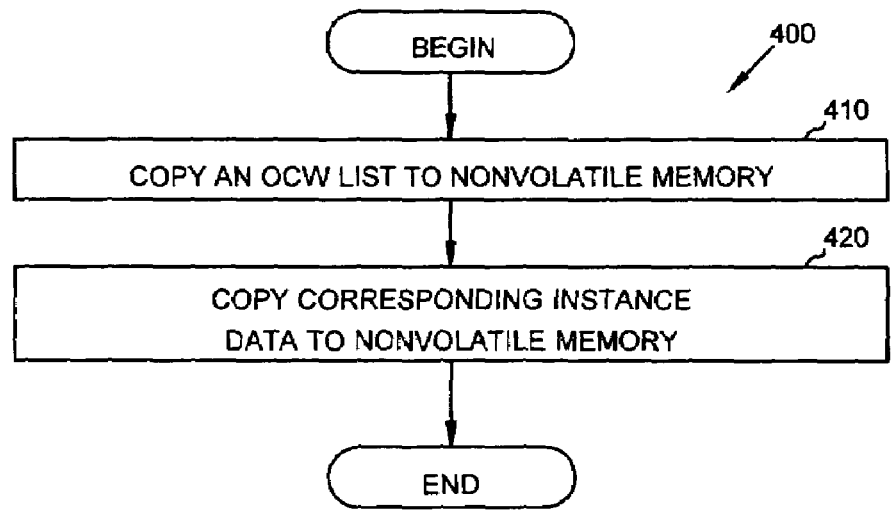
FIG. 4 is a flowchart of a method to manage synchronized mirrored data according to an embodiment of the invention.

FIG. 4 is a flowchart of a method 400 to manage synchronized mirrored data in a data storage device according to an embodiment of the invention. Method 400 may be used when there is a power loss condition or other condition that destroys the OCW resident memory. Method 400 includes copying 410 the OCW list to nonvolatile memory. Whether or not the OCW list is copied may depend on if the OCW list is not present in the nonvolatile memory.

Method 400 also includes copying 420 corresponding instance data to nonvolatile memory, if nonvolatile write caching is supported. In some embodiments, the copying 420 is performed using back electromotive force (EMF) generated by a rotating member, such as a disc assembly, of the data storage device. Method 400 enables a data storage device to protect OCW list entries, thus allowing for data synchronization to be completed at a later time.

Figure 5:
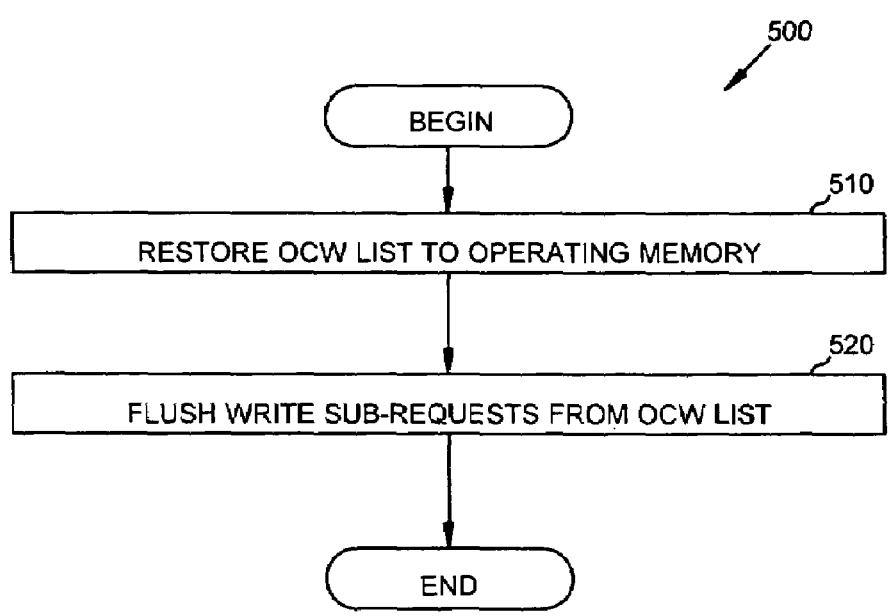
FIG. 5 is a flowchart of a method performed by a data storage device, according to an embodiment of the invention.

FIG. 5 is a flowchart of a method 500 to manage synchronized mirrored data in a data storage device, in which a valid OCW list is present in non-volatile memory. Method 500 may be used in a power-up condition or for any other condition that requires the OCW list to be restored into operating memory. Method 500 includes restoring 510 the OCW list to operating memory and flushing 520 writes from the OCW list during opportune times. In some embodiments, the restoring 510 does not need to happen if the OCW list is run-time maintained in nonvolatile memory.

Figure 6:
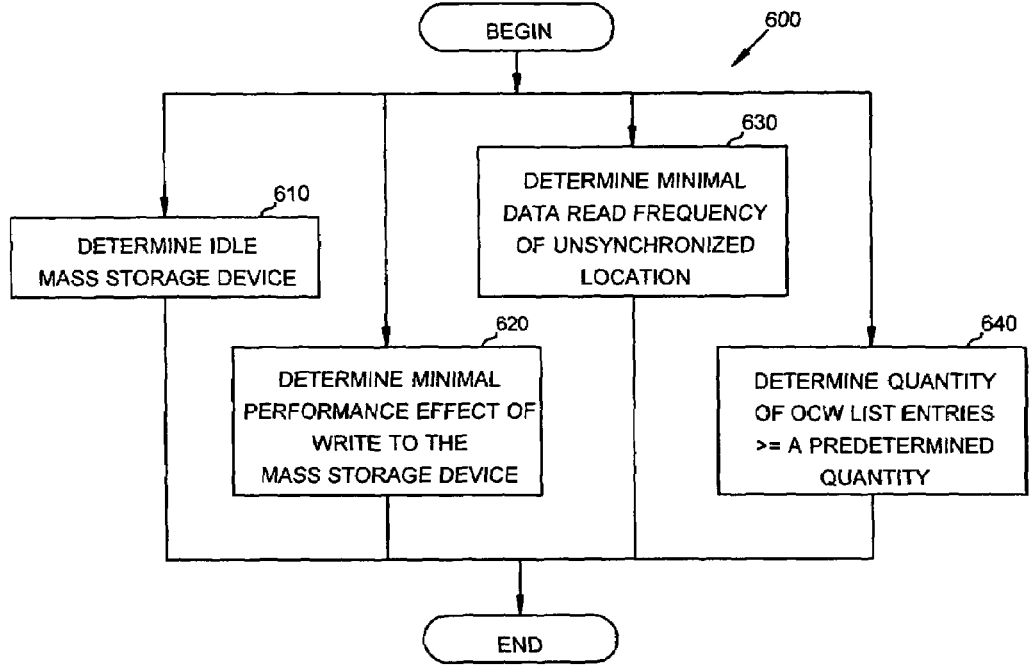
FIG. 6 is a flowchart of a method to identify an opportune time to flush write at least one write sub-request from an OCW list according to an embodiment of the invention.

FIG. 6 is a flowchart of a method 1800 to identify an opportune time to flush at least one write sub-request from an OCW list, according to one embodiment of the invention. An opportune time may be identified in one of many ways, such as determining 610 that the data storage device is idle. Another opportune time may be identified by determining 620 that performing a write to the data storage device from the OCW list will have an effect on the performance of other functions of the data storage device. Usually, a predetermined threshold will be set to monitor the performance effect of the write to the data storage device. Other ways to determine opportune time to flush write from an OCW list include determining 630 that data is being read, with frequency that is at least a predetermined threshold, from an unsynchronized location of the data storage device. Still further, an opportune time may be identified by determining 640 that the quantity of entries in the OCW list is at least equal to a predetermined quantity.

Figure 7:
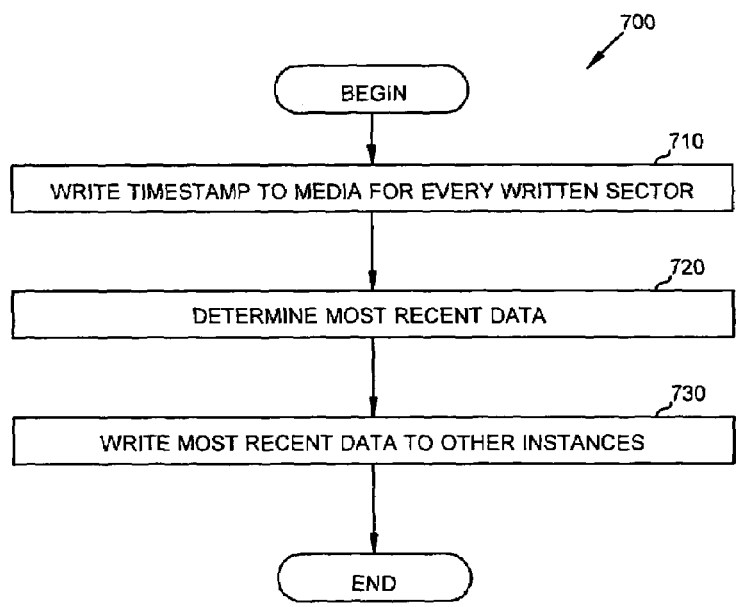
FIG. 7 is a flowchart of a method to manage synchronized mirrored data according to an embodiment of the invention.

FIG. 7 is a flowchart of a method 700 to manage synchronized mirrored data in a data storage device, according to an embodiment of the invention. Method 700 may be used to initialize a data storage device having an invalid OCW list in nonvolatile memory. Method 7 may be used as an alternative to methods 400 and 500 when there is a power loss condition or when recovering from a corrupted OCW list. Method 700 includes writing 710 a timestamp to the storage media for every sector that is written, determining 720 the most recent data, and, if the data is not synchronized, writing 730 the most recent data to the other copies. In some embodiments, the determining includes synchronizing data by scanning every copy of every sector to determine the most recent data.

Figure 8:
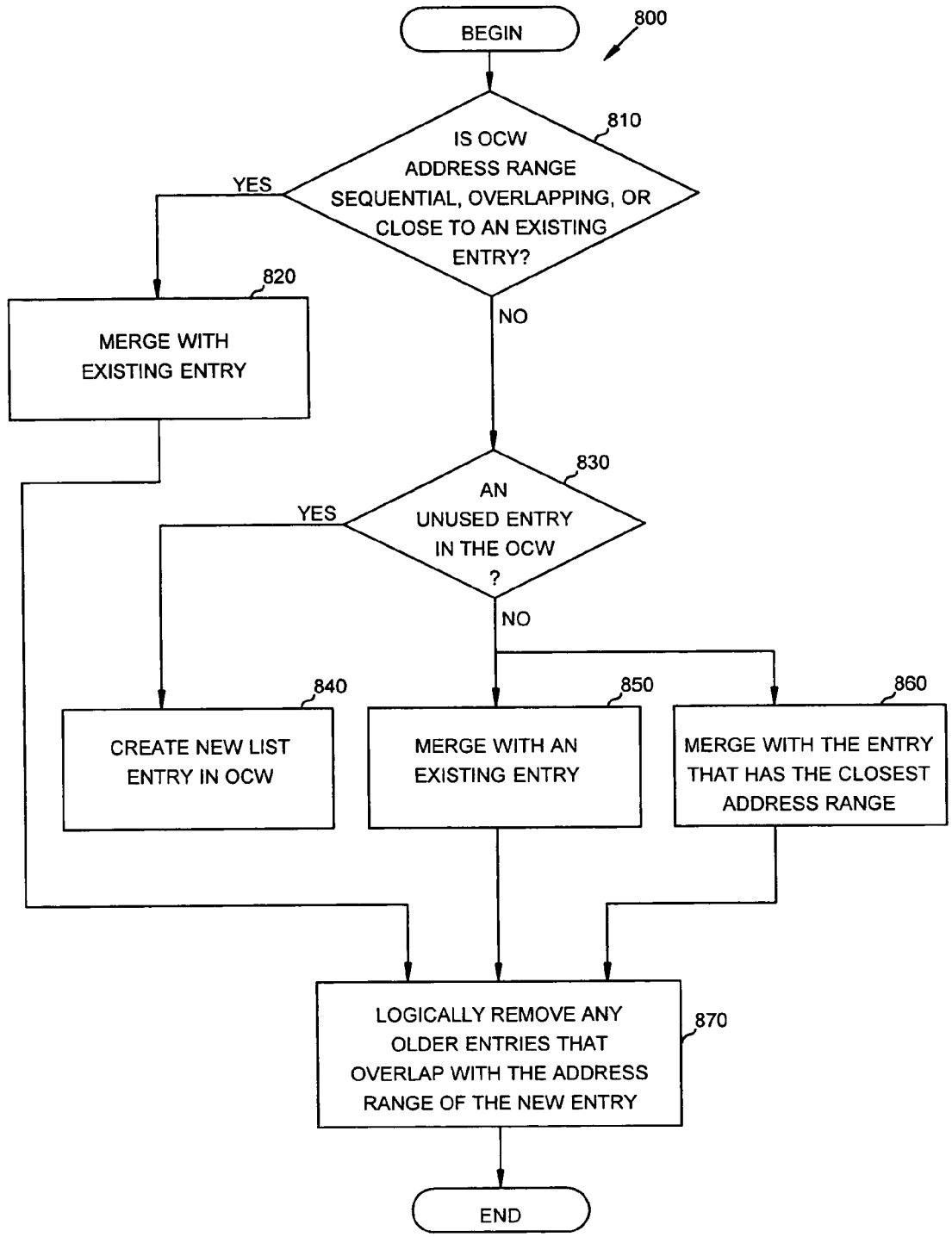
FIG. 8 is a flowchart of a method to add a new entry to an OCW list, according to an embodiment of the invention.

FIG. 8 illustrates a method 800 to add a new entry to an OCW list, according to an embodiment of the invention. Method 800 includes determining 810 whether or not an address associated with the new entry is sequential, overlapping or close to an address associated with an existing entry in the OCW list. If the address associated with the new entry is sequential, overlapping or close to an address associated with an existing entry in the outstanding-copy-write list, the new entry may be merged 820 with the existing entry in the OCW list.

A determination 830 is made if an unused entry exists in the OCW list. If an unused entry exists, a new entry is created 840 in the OCW list. If an unused entry does not exist in the OCW list the new entry is merged 850 with an existing entry. Additionally, method 800 may also include logically removing 870 any older entries that overlap with the address range of the new entry. Method 800 may include merging 860 the new entry with an existing entry that has the closest LBA range.

Figure 9:
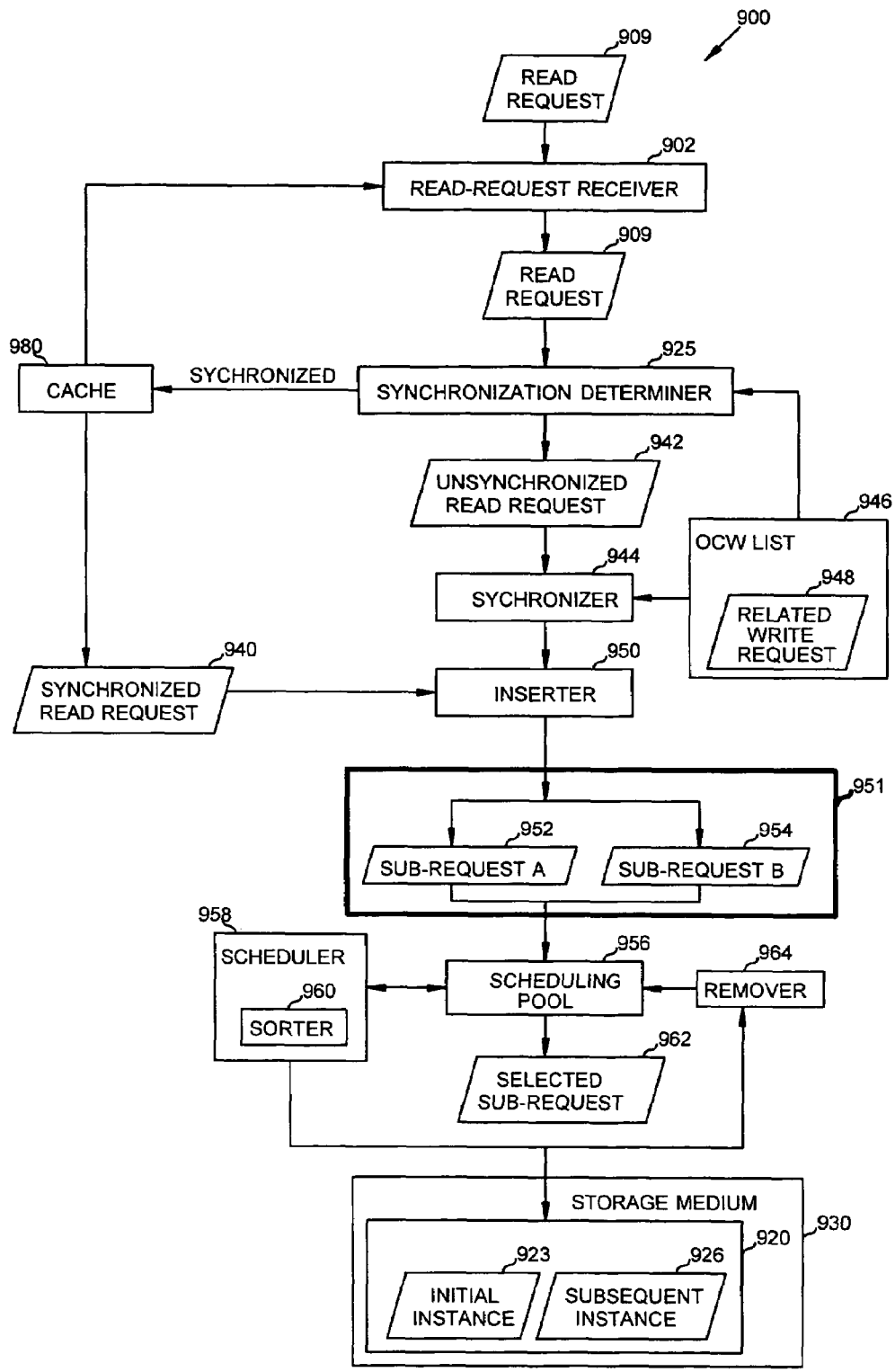
FIG. 9 is a block diagram of an apparatus to manage retrieval of data, according to an embodiment of the invention.

FIG. 9 is a block diagram of an apparatus 900 to manage retrieval of data from a data storage device that has mirrored data, according to an embodiment of the invention. Apparatus 900 includes a receiver 902 of a read request 909. The read request 909 may identify data to be read. The read request 909 may be received from a source other than the data storage device, such as a host computer.

The read request 909 may be associated with mirrored data 920. The mirrored data 920 is stored on a data storage medium 930 in the data storage device. The mirrored data 920 includes an initial instance of data 923, and one or more subsequent instances 926 that are substantially duplicates of the initial instance of the data 923.

Apparatus 900 also includes a synchronization determiner 925 for whether the read request 909 is associated with synchronized or unsynchronized data. In some embodiments, the determination is performed from data obtained from an OCW list 946. The OCW list 946 may be stored on the storage medium 930. The result (not shown) of the determination may be stored as a bit flag (not shown).

When the synchronization determiner 925 indicates that the data is unsynchronized, control is passed to a synchronizer 944. In one embodiment of the synchronizer 944, the synchronizer 944 completes write request entries 948 in an OCW list 946 that are associated with the unsynchronized read request 942.

Apparatus 900 includes an inserter 950 of all read sub-requests 951 into a scheduling pool 956. In one embodiment, each read request 909, is divided or partitioned into N sub-requests for a drive with N instances. For example, when the data is divided into two identical mirrored instances, as in the initial instance 923 and the subsequent instance 926, the read command is divided or partitioned into two sub-requests such as sub-request A 952 and sub-request B 954. Furthermore, each sub-request has an indication of the unique address that the data is stored on the data storage medium. In some embodiments where the data storage device is a disc drive, each address includes the rotational position of the data because the N instances may be rotationally staggered on the data storage medium.

Apparatus 900 also includes a scheduler 958 of all of the read sub-requests 951. The scheduler 958 determines the schedule or priority of the sub-requests 951 in the scheduling pool 956. A sorter 960 in the scheduler 958 uses a rotational position sorting algorithm or an alternative algorithm to select the sub-request 962 in the scheduling pool 956 that will yield the best throughput and/or response time characteristics that are desired.

Additionally, apparatus 900 includes a remover 964. All sub-requests that are not selected for reading are removed from the scheduling pool 956 by the remover 964. In some embodiments, the remover 964 removes all associated sub-requests that remain in the scheduling pool 956 after the selected sub-request 962 is scheduled by the scheduler 958. In some embodiments, the remover 964 removes all associated sub-requests that remain in the scheduling pool 956 after the selected sub-request 962 is performed. For example, if the scheduler 958 selected sub-request B from among the two sub-requests, sub-request A 952 and sub-request B 954, in scheduling pool 956, after sub-request B 954 is performed, the remover 964 removes sub-request A 952 from the scheduling pool 956.

When the determiner 925 indicates that the data is synchronized, control is passed to the cache 980, which is prompted to send a synchronized read request 940 to the inserter 950.

As an alternative to apparatus 900, when the synchronization determiner 925 yields an indication that the read request 909 specifies unsynchronized data, the most recent data is read.

In apparatus 900, the data storage device 930 fulfills the read request 909 from valid cache data in a cache 980, when the valid cache data exists, because retrieving data from a cache 980 is typically the fastest manner of retrieving the data. This is done irrespective of whether or not the data is synchronized on the data storage medium. In other words, the read command 909 will be fulfilled or satisfied by valid cache data in the cache 980 if the data of the read command 909 exists, without passing control to the synchronization determiner 925.

Apparatus 900 provides the ability to manage mirrored and/or synchronized data 920 within the data storage device. Performance of read operations is improved in apparatus 900 by selecting the most effective instance to read, whether the instance that is faster to retrieve is a cached instance or on the data storage medium 930. A data storage device is much more capable than a conventional external controller of managing and optimizing mirrored read performance. In some embodiments where the data storage device is a disc drive, the disc drive uses information that is not readily available externally to the data storage device, such as the geometry of the disc drive and current position of a read/write head, to schedule the optimal request.

Figure 10:
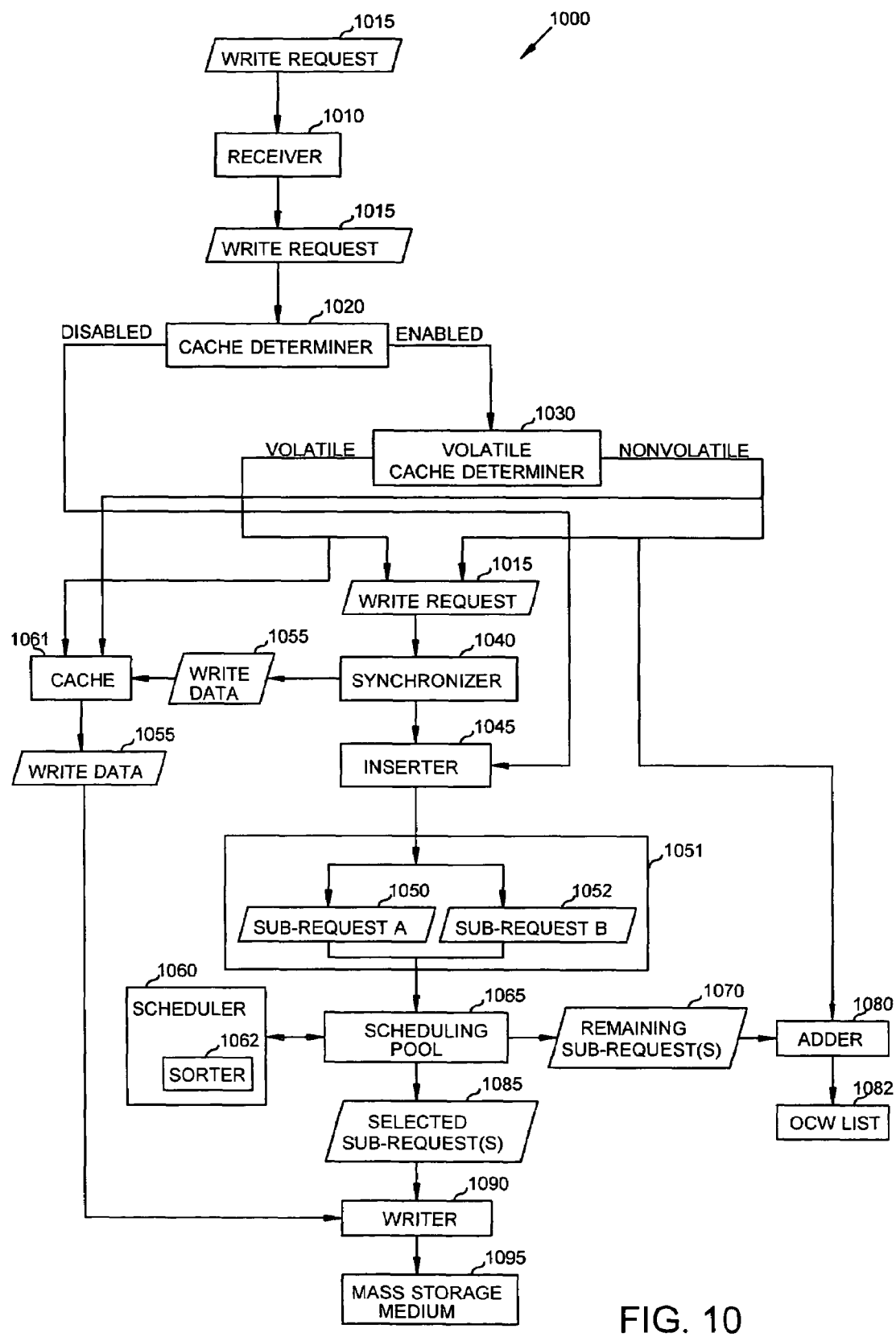
FIG. 10 is a block diagram of an apparatus to manage writing of data, according to an embodiment of the invention.

FIG. 10 is a block diagram of an apparatus 1000 to manage writing of data on a data storage device that has synchronized mirrored data, according to an embodiment of the invention. Write requests may occur to unsynchronized locations on the media. In this case, the write request is effectively divided into N sub-requests for a drive with N copies of the synchronized data. One of the functions of apparatus 1000 is that outstanding writes to the same copy locations may be discarded. The drive data storage device may accomplish this by write caching with this functionality. Write caching allows the drive to return status prior to writing a first copy. Alternatively, this functionality may also be incorporated into nonvolatile write caching functionality.

Apparatus 1000 includes a receiver 1010 of a write request 1015. In some embodiments, the write request 1015 is associated with mirrored data. Also included is caching type determiner 1020 for the write request 1015 is associated with enabled or disabled caching.

In some embodiments, the determiner 1020 yields an indication that the write request 1015 is associated with enabled caching. Where caching is enabled, control is passed to a volatile cache determiner 1030 for deducing whether the write request 1015 is associated with volatile or nonvolatile caching. Where volatile caching is enabled, control is passed to a synchronizer 1040 that guarantees and/or ensures synchronization of data.

Apparatus 1000 includes an inserter 1045 that inserts write sub-requests into a scheduling pool 1065. A at least one write sub-request 1051 is generated by the inserter 1045 from the write request 1015. Examples of write sub-requests 1051 are write sub-request A 1050 and write sub-request B 1052. One sub-request is generated for each instance of the write data 1055 to be written on the data storage medium. Each of the plurality of write sub-requests are associated with a unique address on the data storage medium. In a disc drive, each address may have a different rotational positional than each of the other write sub-requests. Writing each of the sub-requests 1051 with different rotational positions allows subsequent write requests for the mirrored data to be read quickly by selecting the instance of the data that has the closest rotational position. 1

Apparatus 1000 also includes a scheduler 1060 that determines the schedule of the sub-requests in the scheduling pool 1065. The scheduler 1060 schedules a selected sub-request 1085. In some embodiments, scheduler 1060 includes a sorter 1062 that uses a rotational position sorting algorithm or an alternative algorithm to select a sub-request 1085. The selected sub-request 1085 is usually selected to yield the best throughput and/or response time characteristics that are desired. In some embodiments, the desired characteristic is performance, wherein the sub-request of data that is closest to the rotational position of the disc head is selected for writing. The one or more sub-requests that are not the selected sub-request 1085 are the remaining sub-requests 1070.

A writer 1090 is operably coupled to the scheduling pool 1065. The writer 1090 performs the selected sub-request 1085 in a data storage medium 1095. The data 1055 associated with the selected sub-request 1085 in the cache 1061 is transferred by the writer 1090 to the data storage medium 1095.

All sub-requests that are not selected for writing may be removed from the scheduling pool 1065. In some embodiments, all associated sub-requests are removed that remain in the scheduling pool 1065 after the selected sub-request 1085 is scheduled by the scheduler 1060. In some embodiments, all associated sub-requests are removed that remain in the scheduling pool 1065 after the selected sub-request 1085 is performed. For example, if the scheduler 1060 selected sub-request B from among the two sub-requests sub-request A 1050 and sub-request B 1052 in scheduling pool 1065, after sub-request B 1052 is performed, sub-request A 1050 is removed from the scheduling pool 1065. The scheduling pool 1065 is operably coupled to the inserter 1045 and the scheduler 1060.

The sub-requests that are not selected are saved in the OCW list 1082 so that the instances of data in the cache 1060 that are associated with the remaining sub-requests 1070 can be written to the data storage medium later.

In some embodiments, the determiner 1030 may yield an indication that the write request 1015 is associated with nonvolatile caching. Where nonvolatile caching is enabled, control passes to a synchronizer 1050 that ensures synchronization of data. The adder 1080 inserts a designated entry that lists all copies in the OCW list.

When the determining 1020 yields an indication, such as a flag, that the write request 1015 is associated with disabled caching. Where caching is disabled, control is passed to inserter 1045.

The OCW list 1082 is a data structure, such as a table, that indicates write sub-requests that have not been performed to a data storage medium. The OCW list includes one or more entries.

The data storage device must always be aware of all remaining outstanding writes to copies to guarantee that all copies eventually contain the same data. All outstanding copy writes are recorded into the OCW (outstanding copy write) list. The necessary information needed to complete the outstanding writes is included in the OCW list. Each list entry must include at least the LBA or PBA, length, and copy indicator. A copy indicator referring to the most recent data may also need to be saved if more than two copies exist. If write caching is enabled and no copies have been written, then the cache memory location of the write data is also saved. Non-write caching implementations may also save the cache memory location of write data. Non-write caching implementations may retain some or all of the write data in cache to improve the performance of writing other copies. The length of the list is limited by the amount of volatile memory (if the list is initially stored in volatile memory) and nonvolatile memory.

Power loss, hard reset conditions, and events that destroy volatile memory contents require that the drive save information on all outstanding writes, listed in the OCW list, into a nonvolatile memory. The OCW list must be saved so the drive can synchronize the copies at some later point in time. Nonvolatile memory can take the form of flash memory that is programmed upon power loss using back EMF or batteries, battery packed SRAM, or other nonvolatile technologies. For non-volatile caching, every outstanding internal write is recorded into memory, possibly volatile, at the point status is sent to the host for the write. Outstanding writes that are logged into volatile memory are transferred into non-volatile memory upon power loss or hard reset or any other condition that would destroy volatile memory. Corresponding write data may also have to be transferred to nonvolatile memory if nonvolatile write caching is enabled and no copies have been written to disc. The drive is still cognizant of all outstanding writes upon restoration of power or recovery from reset or other condition by reading the OCW list from nonvolatile memory.

Figure 11:
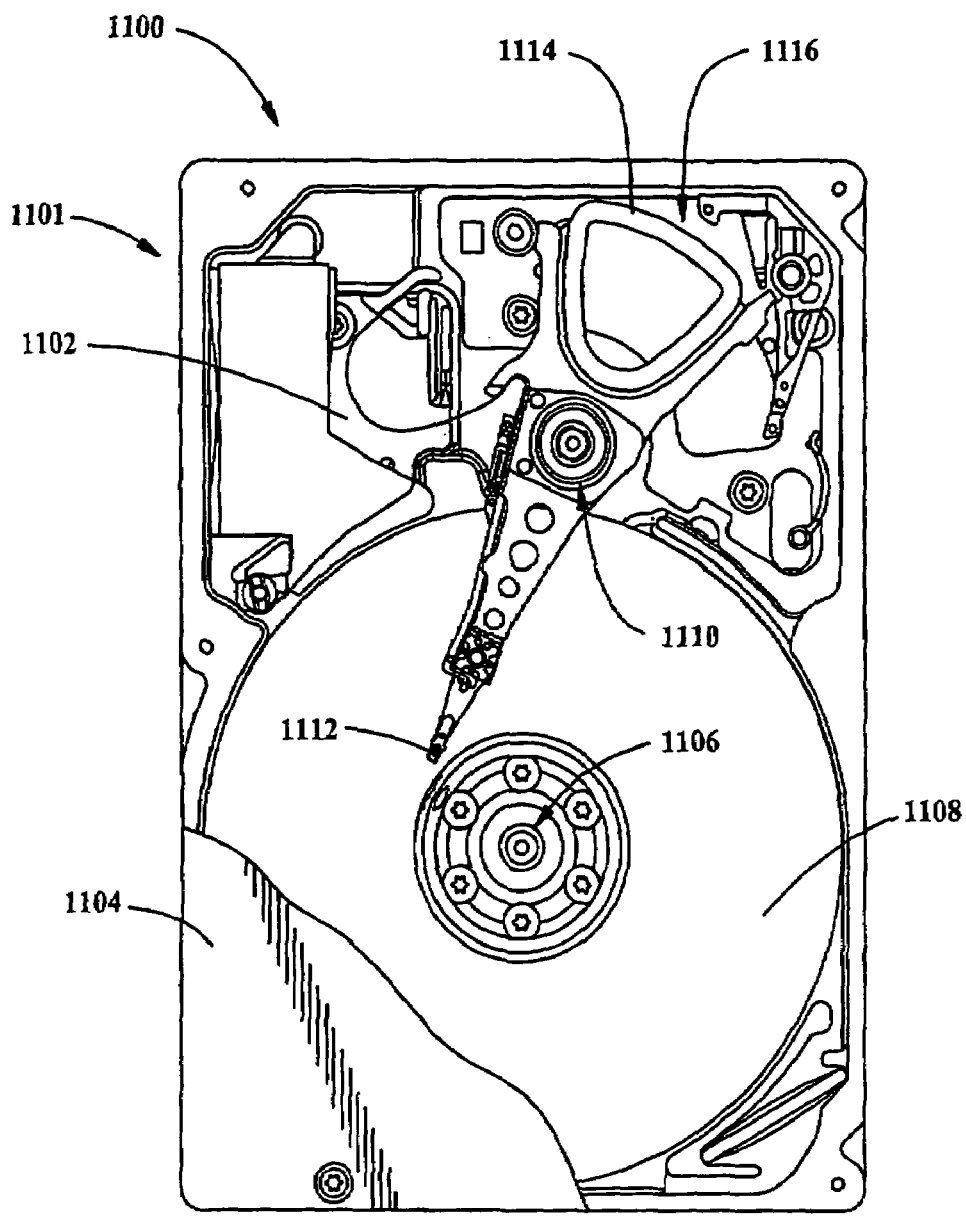
FIG. 11 illustrates a plan view of a disc drive incorporating a preferred embodiment of the present invention showing the primary internal components.

FIG. 11 is an exploded view of one embodiment of the present invention, this embodiment showing a disc drive 1100. The disc drive 1100 is one example of a data storage device, such as compact disc (CDROM) devices, tape cartridge devices, digital versatile disc (DVD) or digital video disc (DVD) devices. FIG. 11 provides a top plan view of a disc drive block data storage device 1100. The disc drive 1100 includes a sealed housing 1101 formed by a rigid base deck 1102 and a top cover 104 (shown in partial cutaway).

Mechanical components of the disc drive 1100 are supported within the housing 1101, including a spindle motor 1106 which rotates a number of recording discs 1108 at a constant high speed, and an actuator assembly 1110 supports a corresponding number of data transducing heads 1112 adjacent the discs 1108. The actuator assembly is rotated about an actuator axis through application of current to a coil 1114 of a voice coil motor (VCM) 1116.

Figure 12:
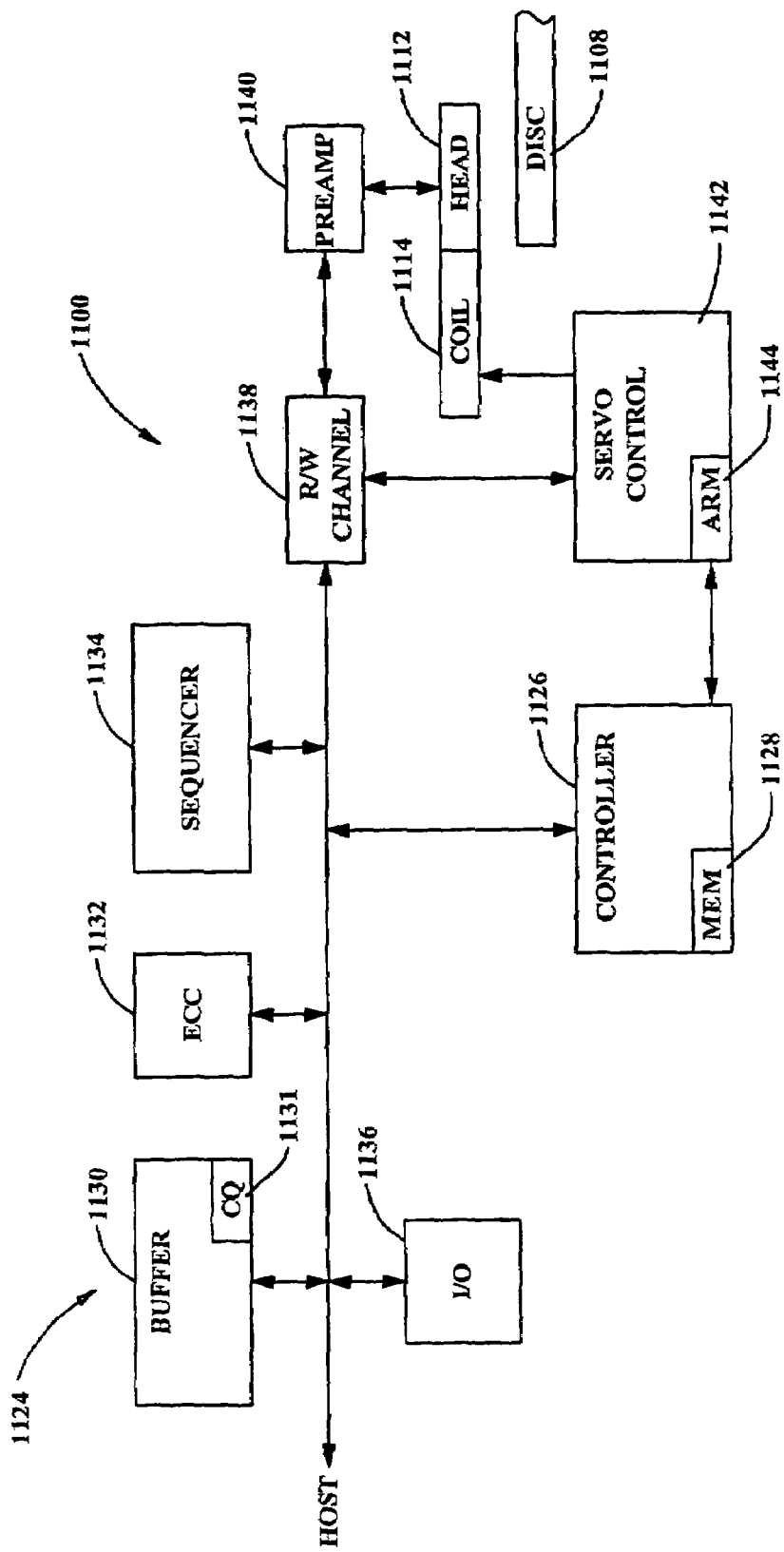
FIG. 12 illustrates a simplified functional block diagram of the disc drive shown in FIG. 11.

FIG. 12 provides a functional block diagram for the disc drive 1100. A hardware/firmware based interface circuit 1124 communicates with a host device (such as a personal computer, not shown) and directs overall disc drive operation. The interface circuit 1124 includes a programmable controller (processor) 1126 with associated memory 1128, a buffer 1130, an error correction code (ECC) block 1132, a sequencer 1134 and an input/output (I/O) control block 1136.

The buffer 1130 temporarily stores user data during read and write operations, and includes a command queue (CQ) 1131 where multiple pending access operations are temporarily stored pending execution. The ECC block 1132 applies on-the-fly error detection and correction to retrieved data. The sequencer 1134 asserts read and write gates to direct the reading and writing of data. The I/O block 1136 serves as an interface with the host device.

FIG. 12 further shows the disc drive 1100 to include a read/write (R/W) channel 1138 which encodes and serializes data during write operations and reconstructs user data from the discs 1108 during read operations. A preamplifier/driver circuit (preamp) 1140 applies write currents to the heads 1112 and provides pre-amplification of readback signals.

A servo control circuit 1142 uses servo data to provide the appropriate current to the coil 1114 to position the heads 1112 as required. The servo control circuit 1142 preferably comprises a programmable ARM processor 1144 (Advanced Reduced-Instruction-Set-Computer (RISC) Machine). The controller 1126 communicates with the ARM 1144 to move the heads 1112 to the desired locations on the discs 1108 during execution of the various pending access commands in the command queue 1131 in turn.

In summary, a method is provided for receiving 210 a read command associated with mirrored data of a data storage medium in a data storage device and determining 220 whether the read command is associated with synchronized or unsynchronized data. Another embodiment may include, inserting 270 at least one read sub-request from the read command into a scheduling pool; scheduling 280 one of the read sub-requests; and removing 290 remaining sub-requests from the scheduling pool.

Another embodiment is a method comprising the steps of receiving 310 a write command associated with mirrored data of a data storage medium in a data storage device; and determining 320 whether the write command is associated with enabled or disabled caching.

Also described is a method to add a new entry to an outstanding-copy-write list in a data storage device, the method including merging the new entry with the existing entry in the outstanding-copy-write list, if the address associated with the new entry is sequential, overlapping or close to an address associated with an existing entry in the outstanding-copy-write list; and creating a new entry in the outstanding-copy-write list, if an unused entry exists in the outstanding-copy-write list and if the address associated with the new entry is not sequential, overlapping or close to an address associated with an existing entry in the outstanding-copy-write list.

Also provided is a method to manage a destructive condition associated with an outstanding-copy-write resident list in volatile memory in a data storage device, including copying 410 the outstanding-copy-write list to nonvolatile memory; and copying 420 corresponding instance data to nonvolatile memory.

Another embodiment includes a method to initialize a data storage device with a valid outstanding-copy-write list in nonvolatile memory associated with synchronized mirrored data in the data storage device, by restoring 510 the outstanding-copy-write list to operating memory and performing 520 writes from the outstanding-copy-write list during opportune times.

In yet another embodiment of the present invention, a method to perform entries in an outstanding-copy-write list of a data storage device includes determining 610 that the data storage device is idle. In a further embodiment, the method includes determining 620 that performing a write to the data storage device from the outstanding-copy-write list will have an effect on the performance of other functions of the data storage device that is less than a predetermined threshold. In yet another embodiment, the method includes determining 630 that data is being read with frequency at least equal to a predetermined threshold from an unsynchronized location of the data storage device. The method may also include determining 640 that the quantity of entries in the outstanding-copy-write list is at least equal to a predetermined quantity.

Another embodiment of the present invention includes a method to initialize a data storage device having an invalid outstanding-copy-write list in nonvolatile memory that is associated with synchronized mirrored data in the data storage device, including writing 710 a timestamp to the recording media for every sector that is written; determining 720 the most recent data; and writing 730 the most recent data to the other instances, if the data is not synchronized.

A data storage device is also provided including: at least one data storage medium; and a controller, communicatively coupled to the data storage medium. The controller including a data structure suitable for representing at least one write sub-request of mirrored data on the data storage medium that has not been performed to the data storage medium and a synchronizer of the mirrored data on the data storage medium. A further embodiment of the data storage device including a representation of a logical buffer address, if non-volatile caching is being used; a representation of the instance of the write request; a representation of the length of write-data associated with the sub-request; and a representation of a location of the write-data.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the data synchronizing while maintaining substantially the same functionality without departing from the scope and spirit of the present invention. In addition, although the preferred embodiment described herein is directed to a data synchronization method for a disc drive, it will be appreciated by those skilled in the art that the teachings of the present invention can be applied to other systems, like CD-Rs, CD-RWs, tape or any data storage system, without departing from the scope and spirit of the present invention.

What is claimed is:

1. A method comprising the steps of:
   receiving a command to retrieve data associated with mirrored data of a data storage medium in a data storage device;
   determining whether the retrieve command is associated with synchronized or unsynchronized data;
   inserting at least one retrieve sub-request from the retrieve command into a scheduling pool;
   scheduling one of the retrieve sub-requests; and
   removing remaining sub-requests from the scheduling pool.

2. The method of claim 1, and further comprising if the retrieve command is associated with unsynchronized data: synchronizing data.

3. The method of claim 2, wherein the synchronizing data further comprises the steps of:
completing stores of entries in a data structure indicating which store requests have not been completed that are related to the command.

4. The method of claim 1, if the retrieve command is associated with unsynchronized data:
retrieving most recently stored data.

5. A data storage device comprising:
a data storage medium comprising mirrored data;
an input for receiving a retrieve command associated with the mirrored data; and
a controller, which determines whether the retrieve command is associated with synchronized or unsynchronized data, inserts at least one retrieve sub-request from the retrieve command into a scheduling pool, schedules one of the retrieve sub-requests, and removes remaining sub-requests from the scheduling pool.

6. The data storage device of claim 5 and further comprising a synchronizer, which synchronizes the data if the retrieve command is associated with unsynchronized data.

7. The data storage device of claim 6, wherein the controller is further adapted to complete stores of entries in a data structure indicating which store requests have not been completed that are related to the command.

8. The data storage device of claim 5, the controller is adapted to retrieve most recently stored data if the retrieve command is associated with unsynchronized data.

* * * * *